(12) United States Patent  
Rogge et al.

(10) Patent No.: US 6,604,862 B2
(45) Date of Patent: Aug. 12, 2003

(54) MULTICHANNEL OPTICAL COUPLING CONFIGURATION

(75) Inventors: Clemens Rogge, Berlin (DE); Hans-Dieter Weigel, Caputh (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/195,077

(22) Filed: Jul. 12, 2002

(65) Prior Publication Data

US 2003/0012520 A1 Jan. 16, 2003

Related U.S. Application Data

(63) Continuation of application No. PCT/DE01/00088, filed on Jan. 5, 2001.

(30) Foreign Application Priority Data

Jan. 12, 2000 (DE) .......................................... 100 01 680

(51) Int. Cl.[7] .................................................. G02B 6/38
(52) U.S. Cl. ............................ 385/56; 385/53; 385/76; 385/92
(58) Field of Search ...................... 439/352–54; 385/56, 385/59, 76, 92, 53, 54, 69

(56) References Cited

U.S. PATENT DOCUMENTS

| 5,091,991 A | 2/1992 | Briggs et al. | 385/82 |
| 5,138,680 A | 8/1992 | Briggs et al. | 385/90 |
| 5,333,221 A | 7/1994 | Briggs et al. | 385/55 |

FOREIGN PATENT DOCUMENTS

| DE | 42 05 568 A1 | 8/1992 |
| DE | 43 03 737 A1 | 8/1994 |
| DE | 195 39 549 C1 | 12/1996 |
| EP | 0 330 231 B1 | 8/1989 |
| EP | 0 430 107 B1 | 6/1991 |
| EP | 0 485 196 B1 | 5/1992 |
| EP | 0 712 015 A2 | 5/1996 |
| EP | 0 803 748 A1 | 10/1997 |
| EP | 0 803 749 A1 | 10/1997 |
| EP | 0 807 837 A1 | 11/1997 |
| EP | 0 896 397 A2 | 2/1999 |
| WO | WO 97/34176 | 9/1997 |
| WO | WO 99/28774 | 6/1999 |

*Primary Examiner*—Renee Luebke
*Assistant Examiner*—Ann McCamey
(74) *Attorney, Agent, or Firm*—Laurence A. Greenberg; Werner H. Stemer; Ralph E. Locher

(57) ABSTRACT

A coupling system includes an optical plug-in connector, a coupling partner and a retaining element. The housing of the plug-in connector is provided with a sliding key and with two springy detent limbs which include a detent nose for engaging with the coupling partner. In order to receive the plug-in connector, the coupling partner is provided with a plug inlet which has recesses that correspond to the detent noses of the plug-in connector. A retaining element includes a laterally displaceable outer housing and an inner housing that is pivotally arranged therein. A locking element is provided as a two-limb lever that is arranged on the inner housing and that serves to lock the plug-in connector in the retaining element. When inserting the plug inlet, this locking is released once the plug-in connector and plug inlet are engaged with one another.

13 Claims, 6 Drawing Sheets

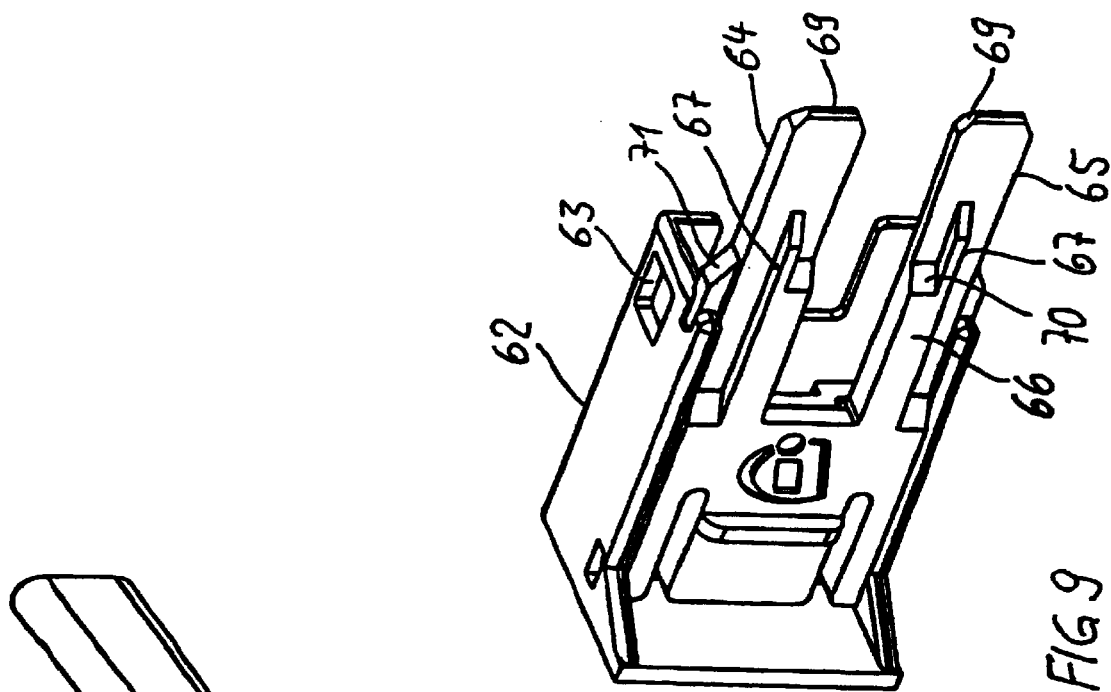
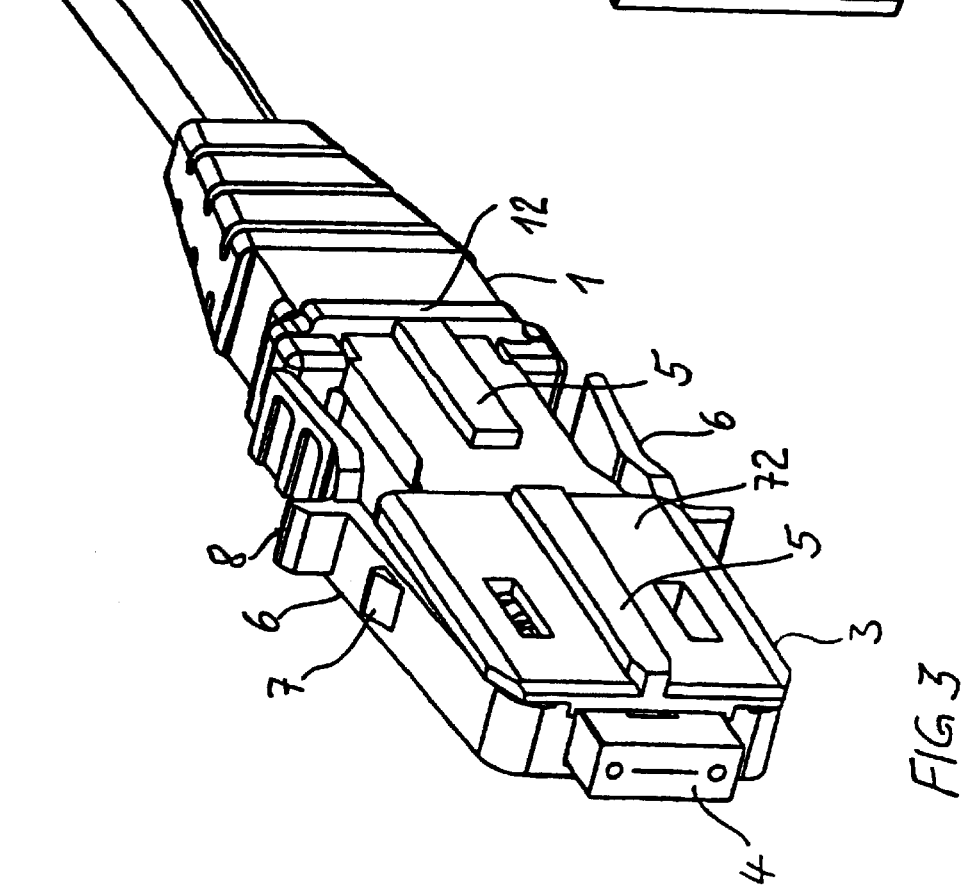

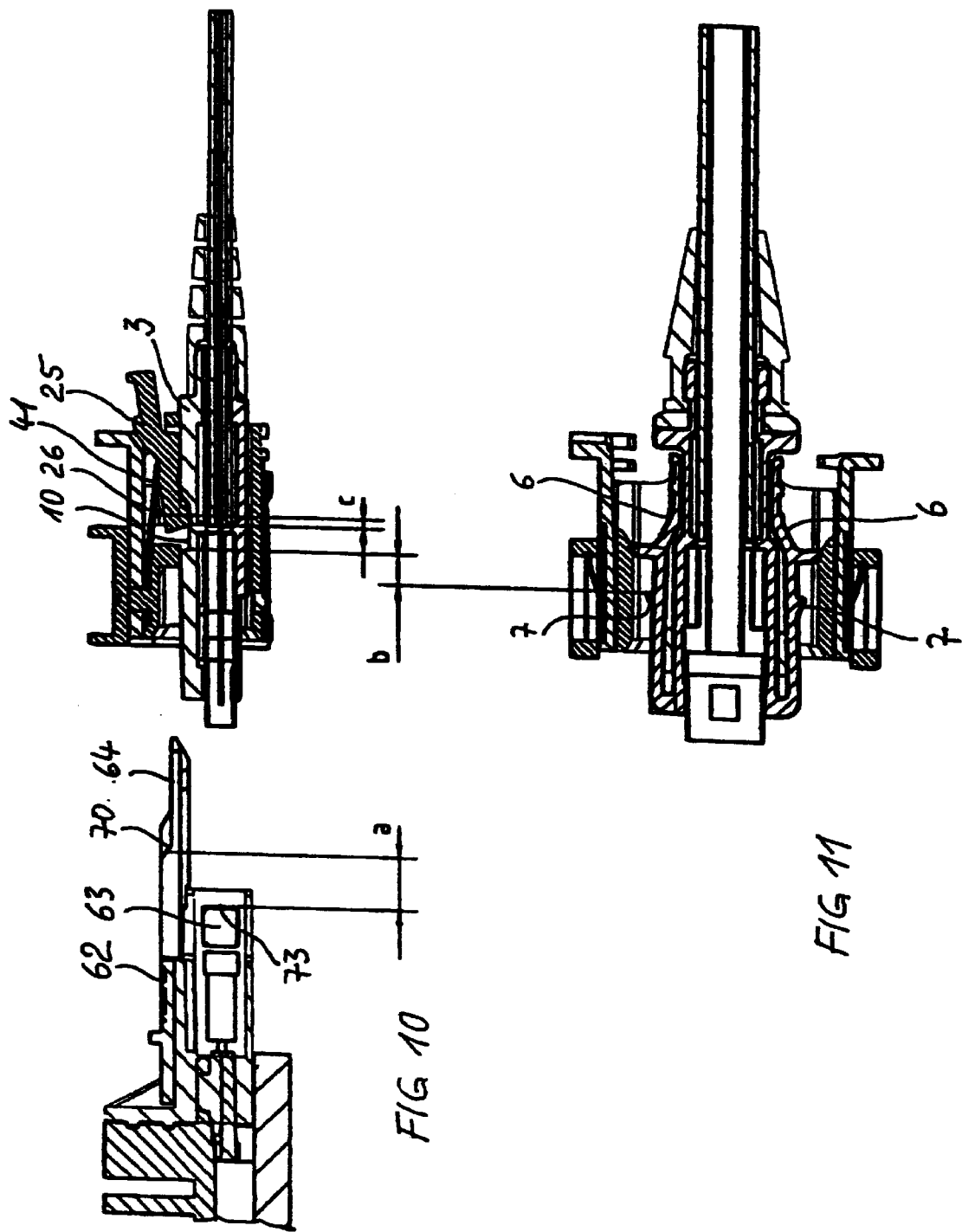

MULTICHANNEL OPTICAL COUPLING CONFIGURATION

CROSS-REFERENCE TO RELATED APPLICATION

This application is a continuation of copending International Application No. PCT/DE01/00088, filed Jan. 5, 2001, which designated the United States and was not published in English.

BACKGROUND OF THE INVENTION

1. Field of the Invention

The invention lies in the field of optical elements and is applied to mechanical connecting devices for optical fibers in which a plurality of optical fibers, which are arranged in parallel to one another and which end in a plug-in connector, are connected to a coupling partner arranged on a circuit board. Using a holder, this plug-in connector is arranged in a housing wall. Coupling partners can be, for example, optical transmitting and/or receiving modules or can be formed by identical or similar plug-in connectors.

European Patent Application EP 0807 837 A1 teaches a known multichannel optical coupling configuration of this type in which one or two plug connectors are assigned to a coupling partner, likewise including one or two plug-in connectors, by using a holder which is arranged in a housing wall (back panel). This holder includes an outer housing having four walls that run toward one another at right angles and an inner housing arranged in the outer housing such that it can be moved axially, that is to say in the Z direction, and at right angles thereto, that is to say in the X/Y direction. The inner housing is used to accommodate and axially fix one or both plug-in connectors, which each contain a multichannel optical fiber end piece arranged in a housing in a known way. This multichannel optical fiber end piece is referred to as a "ferrule" and is arranged at the end of a multichannel optical fiber cable (See also Issued German Patent DE 195 39 549 C1, International Publication WO 97/34176, European Patent application EP 0803 749 A1, and European Patent application EP 0803 748 A1). A coupling partner is arranged on a circuit board using a connector housing. The connector housing can be plugged into the outer housing of the holder, to which end both housings are provided with guide surfaces and interengaging guide grooves and webs. The connector housing is also provided with latching hooks, arranged in a resilient manner, which engage in corresponding openings in the inner housing of the holder and in this way brace the optical fiber end pieces (ferrules) of the plug-in connectors to be coupled axially against each other. The latching and locking elements arranged in the inner region of the holder make disassembling this coupling configuration more difficult.

It is further known, to provide diodes as coupling partners for an optical plug-in connector arranged at the end of an optical fiber cable. These diodes are arranged on a circuit board and a plug-in inlet is provided in order to retain the plug-in connector (See U.S. Pat. No. 5,138,680 and German Patent Application DE 42 05 568 A1). In a coupling configuration which is also known, the plug-in connectors, which are substantially identically designed and arranged in mirror-image fashion in relation to each other, are connected to each other within a two-part adapter (See European Patent Application EP 0712 015 A2). In another known configuration, in each case, a plurality of plug-in connectors are assigned one half of a two-part coupling housing. The two differently designed halves of the coupling housing interengage with finger-like guide wings and corresponding guide grooves and also with retaining collars (See International Publication WO 97/34 176).

SUMMARY OF THE INVENTION

It is accordingly an object of the invention to provide a multichannel optical coupling configuration which overcomes the above-mentioned disadvantages of the prior art apparatus of this general type.

With the foregoing and other objects in view there is provided, in accordance with the invention, a multichannel optical coupling configuration, which includes a plug-in connector, a coupling partner arranged on a circuit board and a holder to be arranged in a recess in a housing wall (back panel) to guide and retain the plug-in connector and to guide the coupling partner. A multichannel optical fiber end piece (ferrule) is arranged in an axially resilient manner in the housing of the plug-in connector and the coupling partner has a plug-in inlet to connect to the plug-in connector, in such a way that the coupling configuration, while being easy to mount and disassemble, permits the compensation even of relatively large tolerances between the board and the back panel transversely with respect to the plug-in direction, as well as the compensation of angular tolerances.

In order to achieve this object, the invention uses some design features which are known for coupling configurations of this type. To some extent, these features are placed in a different operative conjunction and new design features are added. These measures lead to a coupling configuration in which the plug-in connector is locked in the holder such that it can be unlocked in a simple way, and in which the coupling partner can be locked accurately in position with the plug-in connector. In addition, the housing wall carrying the holder is completely relieved of plug forces, and only compressive and tension forces have to be exerted on the plug-in connector or the coupling partner in order to couple and uncouple coupling partner and the plug-in connector. This is achieved by using a special configuration of the holder, including the outer and inner housing, and the parts of the plug-in connector and the coupling partner that come into an operative connection with the inner housing of the holder.

Accordingly, first of all the holder includes an outer housing, which is arranged such that it can be displaced at right angles to the plug-in direction, and an inner housing. The inner housing is arranged such that it can rotate in the outer housing. At the same time, in order to retain the plug-in connector in the holder on the inner housing, a locking element designed as a two-armed lever is mounted. One lever arm of the locking element is subject to the action of a spring. Then, in order to latch the plug-in connector to the coupling partner, the housing of the plug-in connector is provided with at least one resilient latching arm having a latching lug, and the coupling partner is provided with a recess arranged in the plug-in inlet to accommodate the latching lug. For the invention, it is also important that the plug-in inlet of the coupling partner is provided with finger-like guide elements which extend in the plug-in direction, which have operative faces arranged in a stepped manner. Guide faces are assigned on the inner housing of the holder to couple the coupling partner in an accurately fitting manner to the plug-in connector, and also operative faces for unlocking the locking element on the lever arm of the locking element which is subject to the action of a spring. The recess arranged in the plug-in inlet and the operative faces on the finger-like guide elements of the plug-in inlet are staggered in the plug-in direction in such a way that when the coupling partner is joined to the plug-in connector retained in the holder, the locking element arranged in the holder is unlocked after the latching lug of the plug-in connector has latched in the recess in the plug-in inlet.

A coupling configuration configured in this way permits adequate compensation of tolerances between the parts arranged in the housing wall and the parts of the coupling configuration arranged on the circuit board. It is also possible for angular errors with regard to the configuration of the coupling partner on the circuit board to be compensated for by using the pivotable configuration of the inner housing of the holder. The configuration of the locking element as a two-armed, spring-loaded lever permits complete relief of the load on the housing wall from the forces acting between the plug-in connector and the coupling partner in the coupled state, and also enables secure retention of the plug-in connector when the coupling is released. It is possible nevertheless for this retention to be released in a simple way.

In order to be able to implement the latching and locking functions provided when the plug-in connector and the coupling partner are guided together, with the most compact design of the coupling configuration possible, in a development of the invention, the plug-in connector housing is of a flat design and one of its broad sides has a sliding key for the correct lateral assignment to the holder. Each of the narrow sides of the plug-in connector housing has a resilient latching arm with a latching lug. Furthermore, the locking element mounted in the inner housing is assigned to a broad side of the plug-in connector and is configured as a rocker which extends in the plug-in direction. The end of the rocker that is subject to the action of the spring, is designed as a locking lug to engage in a recess extending in the plug-in direction in the plug-in connector housing. The other end of the rocker is freely accessible. In this connection, the locking lug of the locking element has wing-like extensions that run transversely with respect to the plug-in direction. Inclined faces of the locking element, that are for unlocking the locking element, are assigned to the finger-like guide elements of the plug-in inlet of the coupling partner. The recesses in the plug-in inlet of the coupling partner are dimensioned in the plug-in direction such that they permit a relative movement between the plug-in inlet and the plug-in connector housing in the latched state. Finally, the distance, in the plug-in direction, from the latching edge of the respective recess in the plug-in inlet to the inclined faces on the finger-like guide elements of the plug-in inlet is less than the sum of the distances provided in the plug-in direction from the latching lugs of the plug-in connector to the recess provided in the plug-in connector housing for the locking element, and the distance from the recess for the locking element to the wing-like extensions.

The intended compact design is further improved if the recess provided in the plug-in connector for the access of the locking lug is provided in a web forming the sliding key.

In order also to ensure automatic unlatching of the plug-in connector and the coupling partner when the new coupling configuration is being released under the action of tensile forces, in a further refinement of the invention, each latching arm of the plug-in connector housing is provided with a web which is arranged behind the latching lug in the plug-in direction and which runs transversely with respect to the plug-in direction. An inclined plane is assigned in order to unlatch the latching lug on the inner housing of the holder. The distance provided, in the plug-in direction, from the recess in the plug-in connector housing to the web is greater than the distance provided, in the plug-in direction, from the spring-loaded end, designed as a locking lug, to the lever designed as a rocker from the inclined plane provided in the inner housing.

A configuration of this type, with which the unlatching between the plug-in connector housing and the coupling partner, during the release of the coupling, is coordinated with the locking operation between the plug-in connector and the holder, is of special advantage when two or more plug-in connectors or coupling partners are arranged, since all of the coupling partners are unlatched without manual intervention as they are pulled out of the circuit board.

In a further refinement of the invention, the outer housing of the holder can be fixed in the housing wall by a supporting clip. This enables the coupling configuration to be easily mounted.

When a plurality of plug-in connectors are assigned to one housing wall, in order to be able to arrange the plug-in connectors in a space-saving manner as much as possible, it is advantageous if two plug-in connectors and the two holders are arranged in a mirror image fashion in relation to each other in the same recess in the housing wall. This space-saving configuration can be further perfected if the two associated coupling partners, which for example, are formed as optical receiving and/or transmitting modules, but which can also be formed as plug-in connectors, are arranged in a mirror image fashion on the two sides of the circuit board. If in this connection, the outer housing of the holder is constructed from a plastic part and a sheet-metal part in such a way that the mutually facing wall parts of two holders arranged in the same recess in the housing wall consist of thin sheet-metal parts, then this configuration leads to a minimum spacing between the two outer housings, which makes a high packing density possible for the coupling partners arranged on the circuit board. In this way, a distance between the optical axes of two adjacent coupling partners of less than 9 mm can be achieved.

In order to be able to optimally align the plug-in connectors that are locked in the holder in relation to the coupling partners that are arranged on the circuit board, both in the plug-in direction and also transversely thereto, a flat design of the finger-like guide elements of the plug-in inlet is recommended. The tips of the guide elements are provided with bevels serving to align the holder. The guide face, pointing outward, of a guide element is provided with a web-like elevation that is arranged to be set back opposite the respective finger tip. The end of the elevation facing the finger tip has an inclined face used to engage in the locking element.

The intended optimum alignment also requires a specific configuration of the holder, in particular of its inner housing. First of all, in a further refinement of the invention with respect to the outer housing, it is expedient that the outer housing includes a U-shaped plastic part and a likewise U-shaped sheet metal part placed on the plastic part in the manner of a clip. The sheet-metal part is provided with latching tongues to retain the outer housing of the supporting clip. In order at the same time to ensure the preconditions for the pivotable configuration of the inner housing in the outer housing, the sheet-metal part is provided with a pin and the plastic part is provided with a hole. This pin and this hole are operatively connected to a hole and a pin which are arranged on two opposite walls of the inner housing, which includes a plastic part with a substantially box-like outer contour. In addition, guide faces formed with webs and guide grooves for the plug-in connector and for the plug-in inlet of the coupling partner are also provided on the two opposite walls of the inner housing. In order to form these guide faces and guide grooves, there are two webs of an L-shaped cross section, which are carried by one wall of the inner housing and which between them, with the outer L-shaped faces, form a guide groove for the sliding key in the form of a web arranged on the plug-in connector housing. At the same time, the inner L-shaped faces of the webs, form guide faces for the finger-like guide elements of the plug-in inlet. A further web for aligning the finger-like guide elements is arranged laterally beside the L-shaped webs in each case.

The most compact and easy-to-mount configuration of the coupling configuration is provided by using pins to mount the locking element, which is designed as a rocker, in the L-shaped webs in such a way that the locking lug projects into the guide groove for the sliding key.

In order that during the insertion of the plug-in inlet of the coupling partner, the movably arranged holder can assume the optimum position for joining the coupling partner and the plug-in connector as snugly as possible, that is to say without the risk of canting, it is advantageous if the webs that are arranged in the inner housing of the holder begin behind the pins and holes that are provided for pivotably mounting the inner housing, as viewed in the plug-in direction of the coupling partner. The force action points for aligning the inner housing in this case lie behind the pivot axis of the inner housing, as viewed in the plug-in direction.

Other features which are considered as characteristic for the invention are set forth in the appended claims.

Although the invention is illustrated and described herein as embodied in a multichannel optical coupling configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a front perspective view of a plug-in connector;

FIG. 9 is a perspective view of a plug-in inlet shown in FIG. 1;

FIGS. 10 and 11 show a horizontal and a vertical longitudinal section of a plug-in connector locked in the holder with the coupling partner not coupled in order to illustrate the distances required for the locking and latching operation.

DESCRIPTION OF THE PREFERRED EMBODIMENTS

Figure 1:
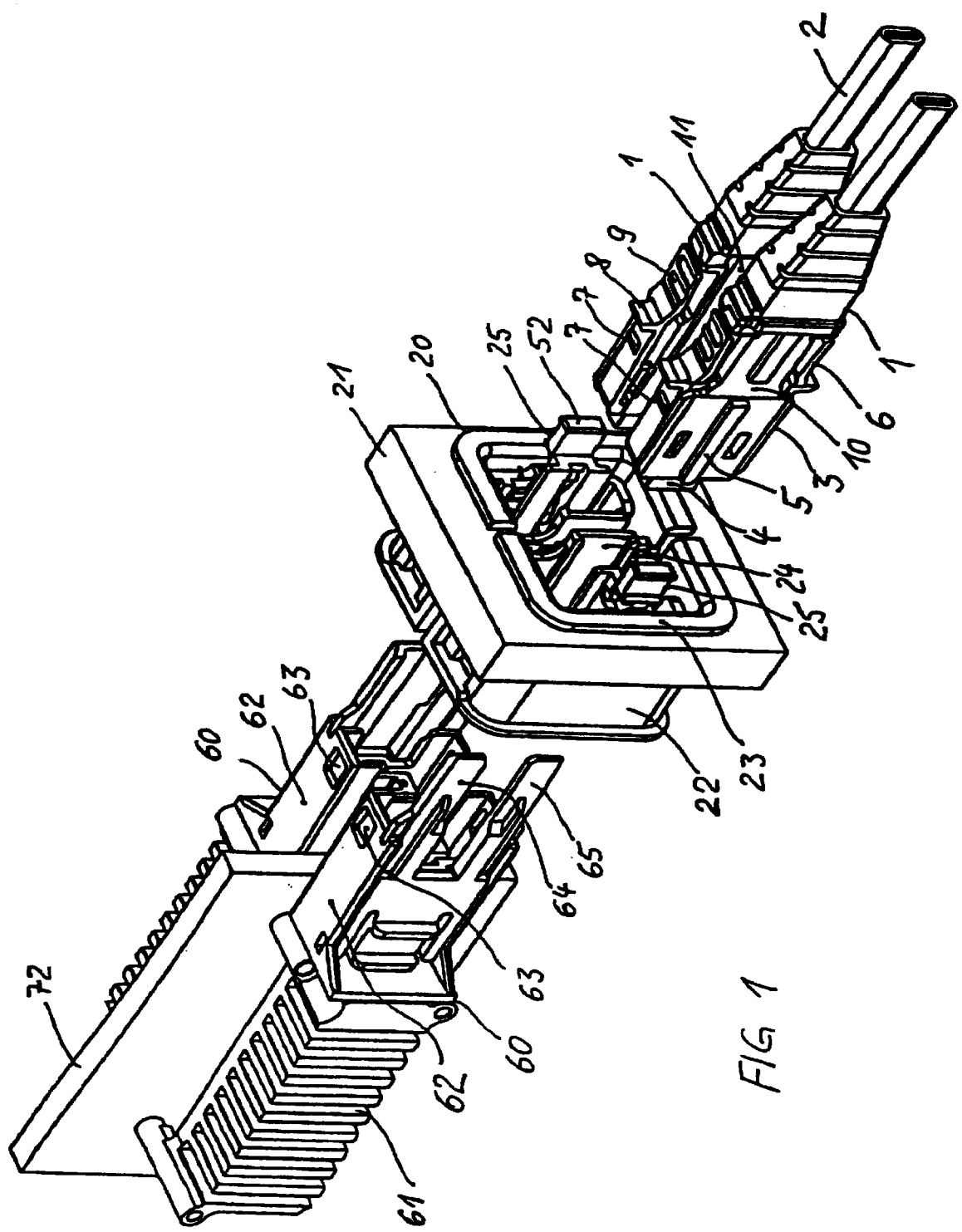
FIG. 1 is a perspective view of the partners of the coupling configuration not yet joined, and specifically shows two plug-in connectors, a part of a housing wall with a holder configured thereon, and a part of a circuit board with two coupling partners in the form of optoelectronic modules.

Referring now to the figures of the drawing in detail and first, particularly, to FIG. 1 thereof, there is shown two identically designed plug-in connectors 1, which are in each case mounted at the end of an optical cable 2 and are provided for the purpose of being plugged into a holder 20 which is arranged in a recess in a housing wall (back plane) 21. Arranged on the opposite side are two likewise identically designed coupling partners 60 on two opposite sides of a circuit board 72. The coupling partners in each case include an electro-optical module 61 and a plug-in inlet 62 fixed thereto. The plug-in inlet 62 has a cross section with a box-like configuration to accommodate a plug-in connector 1. Each plug-in inlet is provided with a recess 63 on two opposite walls. In addition, each plug-in inlet has two finger-like guide elements 64 and 65 extending in the plug-in direction.

The individual plug-in connectors 1 have a housing 3, in which there is arranged an optical end piece 4. The optical end piece 4 projects at the front side of the housing, is spring-mounted in the plug-in direction in the housing, and is designated as a "ferrule". The plug-in connector, which overall is of a flat design, has two narrow housing sides with latching arms 6. Each latching arm 6 has a latching lug 7. The latching lugs 7 are used to latch the plug-in connector in the recesses 63 of the plug-in inlet 62 of a coupling partner 60. Each latching arm 6 has a transversely running web 8 and a free, movable end 9 with grip studs.

One broad flat side of the plug-in connector 1 is provided with a sliding key 5 in the form of a web, which has an interruption 10. This interruption forms a recess in the surface of the plug-in connector 1. On the opposite broad face of the housing 3, the plug-in connector is provided with a plateau 11 for providing guidance into the holder 20.

In order to accommodate the plug-in connectors 1 and the plug-in inlets 62 of the coupling partners 60, the holder 20 has an outer housing 23 and an inner housing 24. The outer housing 23 is fixed to the housing wall 21 by a U-shaped, open clip 22. Part of the inner housing 24 is a locking element 25, which is designed as a two-armed lever and from which the externally accessible free end 52 can be seen.

Figure 2:
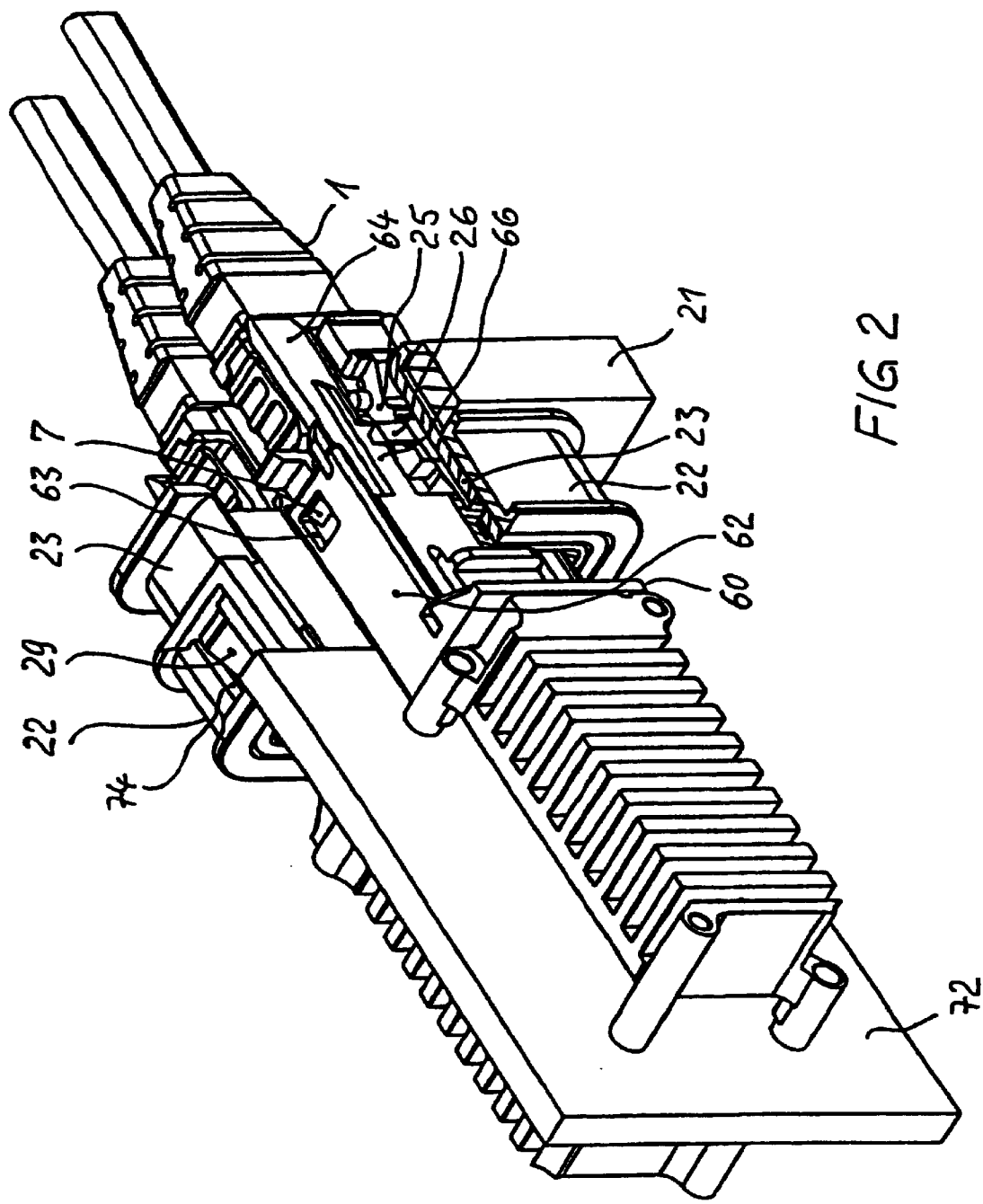
FIG. 2 is a perspective view of the same parts of the coupling configuration as shown in FIG. 1, but they are in a joined state—part of the holder has been cut away in order to show the interplay of the three parts of the coupling configuration.

According to FIG. 2, when plug-in connector 1 and coupling partner 60 are joined, the respective latching lug 7 of one plug-in connector engages in a corresponding recess 63 in a plug-in inlet 62. Furthermore, on the finger-like guide element 64 of the plug-in inlet 62, an operative face 66 can be seen, which is engaged with a wing-like extension 26 on the locking element 25. The interaction of the guide element 64 with the wing-like extension 26 will be explained in more detail further below.

Because of the cut-open holder 20, FIG. 2 clearly shows the two clips 22 formed as a plastic component. Latching tongues 29 belonging to the outer housing 23 engage in corresponding recesses 74 in the clip 22. The recesses 74 in the clip 22 and the latching tongues 29 are dimensioned such that the outer housing 23 can be displaced within certain limits transversely with respect to the plug-in direction, transversely with respect to the clip 22 and therefore transversely with respect to the housing wall 21.

FIG. 3 shows an enlarged illustration of a plug-in connector 1 with the optical end-piece 4, which is designed as a ferrule, arranged inside the housing 3 and the latching arms 6. The latching arms 6 are respectively provided with a latching lug 7 and a web 8 that runs transversely. Both the latching lug 7 and the web 8 have a run-on chamfer. Also marked here is a sliding face 72, with which the plug-in connector 1 slides along on corresponding faces on the inner housing 24 of the holder 20 (see FIG. 1). Furthermore, at the cable end of the sliding key 5, a transverse web 12 is arranged which, during the insertion of the plug-in connector 1, limits the plug-in depth of the plug-in connector 1 by striking a front edge of the inner housing 24.

Figure 4:
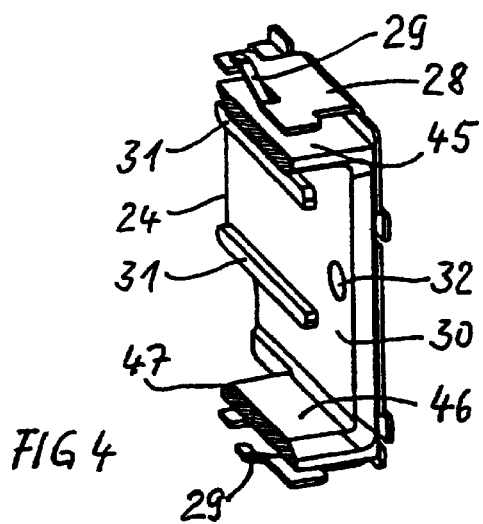
FIGS. 4 and 5 show perspective views of two sectioned halves of longitudinal sections through the holder.
Figure 5:
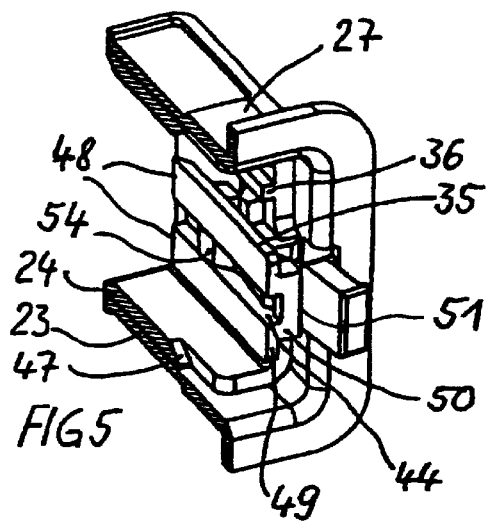
Figure 6:
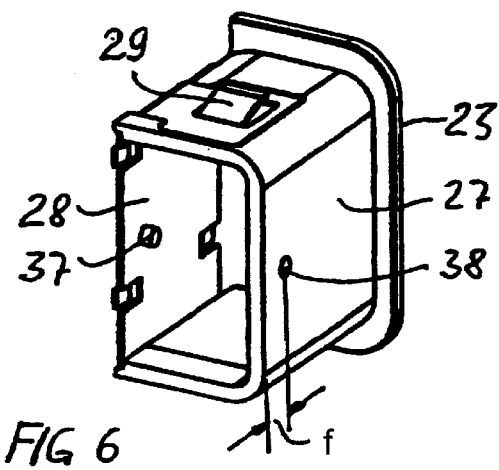
FIG. 6 shows the outer housing.
Figure 7:
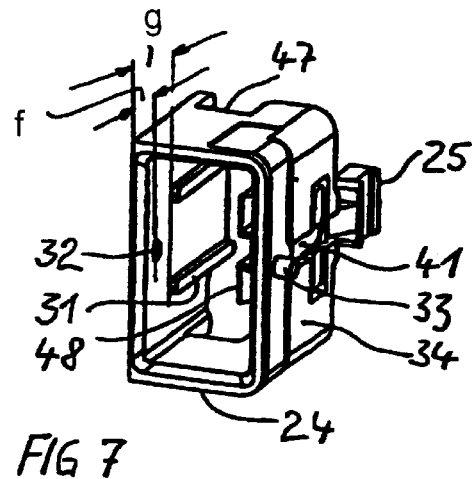
FIG. 7 shows a perspective view of the inner housing of the holder.

FIGS. 4 and 5 each show a perspective view of two sectioned halves of the holder 20 including the outer housing 23 and inner housing 24. The section plane runs in the plug-in direction runs vertically in the view of FIG. 2, and the sectioned half shown in FIG. 4 is folded rearward through 180° as compared with the sectioned half shown in FIG. 5. In both figures, the outer housing 23 is shown only partially. Together with FIGS. 6 and 7, it can be seen here that the outer housing 23 includes a plastic part 27 with a U-shaped cross section and a sheet-metal part 28 with a likewise U-shaped cross section. The sheet-metal part 28 forms a housing wall and is placed in the manner of a clip on the plastic part 27. The sheet-metal part 28 is in each case provided with a latching tongue 29 on the two U-shaped legs. The tongue engages into a corresponding recess in the clip 22, as shown in FIG. 2. The sheet-metal part 28 of the outer housing 23 is further provided with a bearing pin 37, with which a hole 38 on the opposite wall is associated. Pin 37 and hole 38 serve for pivotably mounting the inner housing 24 in the outer housing 23. The inner housing 24, which is configured as a plastic part with a box-like outer contour, likewise has a hole 32 and a pin 33 in each case on two opposite walls 30 and 34. The pin 37 of the outer housing is provided to engage in the hole 32 in the inner housing, and the pin 33 of the inner housing is provided to engage in the hole 38 in the outer housing. The pin 33 of the inner housing reaches through a metal clip which is placed on the inner housing and which has an extension 41 acting as a spring. This spring 41 is engaged with the locking element 25, as can also be seen in FIGS. 10 and 12.

The inner housing 24 is arranged with play in the outer housing 23 in such a way that it can be pivoted vertically within certain limits about the axis formed by the pins 37 and 33.

The inner housing has a wall 30 with two guide webs 31 running in parallel in order to guide the aforementioned plateau 11 that is on one broad flat side of the plug-in connector 1. Formed on the opposite wall 34 is a guide part 35, which serves both to guide the plug-in connector 1 and to guide the plug-in inlet 62 of a coupling partner 60. Furthermore, two guide webs 36 are provided on this wall to guide the finger-like guide elements 64 and 65 of a plug-in inlet 62.

The guide part 35 substantially includes two webs 48 which are L-shaped in cross section and which have the two legs 49 and 50. These webs are connected to each other via transverse struts 51. In each case two legs 50 running parallel to each other and belonging to the two webs 48, together with the transverse struts 51, form a groove 44 between them, in which the sliding key 5 of a plug-in connector 1 is guided. The inner faces of the L-shaped webs 48 and the two webs 36 are used to guide and position the finger-like guide elements 64 and 65 of a plug-in inlet 62 and are provided with appropriate run-on chamfers.

The upper wall 45 and the lower wall 46 of the inner housing 24 are provided, at the end facing the plug-in connectors 1, with a recess which is configured in such a way that an inclined plane 47 results. When the coupling between the plug-in connector and coupling partner is being released, these inclined planes come into engagement with the transverse webs 8 on the latching arms 6 of the plug-in connectors 1.

The pins 33 and 37 and holes 32 and 38, which are arranged in the inner and outer housing 23/24 for pivotably mounting the inner housing 24 in the outer housing 23, are arranged in relation to the guide webs 36 and guide faces on the guide part running in the inner housing in such a way that the holes and pins are arranged at a slight distance f from the edge of the holder, while the guide webs and guide faces begin at a greater distance g from the corresponding edge of the holder.

Figure 8:
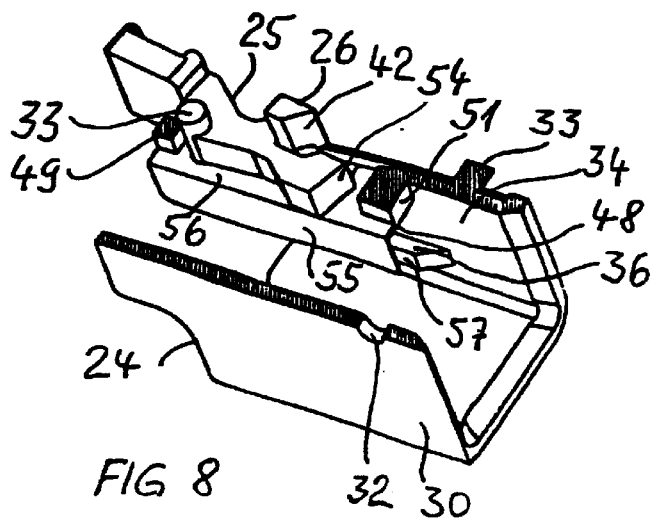
FIG. 8 is a perspective view of the inner housing of the holder, opened in the area of the locking element.

FIG. 8 is a sectional illustration showing a view of the locking element 25 arranged in the inner housing 24. The locking element 25 is provided with two bearing pins 33, which each engage in a recess on a leg 49 of an L-shaped web 48. As a result, the locking element 25 forms a two-arm lever, whose one end is configured as a locking lug 54. This end is subject to the action of the leaf spring 41 (see FIG. 7). Branching laterally from the locking lug 54 are two wing-like extensions 26 which run parallel to the pivot axis of the lever and are in each case provided with a run-on chamfer 42. The extensions 26 serve to unlock the locking element as the result of an action of the finger-like guide elements 64 and 65 of a plug-in inlet 62. When they come into engagement with the wing-like extensions 26, the guide elements 64 and 65 lift the locking lug 54 out of the groove formed between the L-shaped webs 48 and therefore out of the recess or interruption 10 in the sliding key 5. Consequently, the locking element 25 is used to retain a plug-in connector 1 axially in the holder 20 when the coupling partner 60 is not yet plugged in or has been withdrawn. The locking can also be cancelled by the locking element being actuated manually at its free end 52 which is not loaded by a spring.

FIG. 8 also clearly shows the hole 32 in the wall 30 and the pin 33 on the opposite wall 34. It is also possible to see the configuration of an L-shaped web 48 having the transverse struts 51, and also the configuration of a guide web 36. Also marked are the sliding faces 55 for the sliding face 72 of the plug-in connector 1 that is provided with the sliding key, the guide face 56 for the sliding key 5 and the sliding face 57 formed by the web 36 for a guide element of the plug-in inlet.

According to FIG. 9, the plug-in inlet 62 is of substantially box-like shape and is used to accommodate the front end of a plug-in connector 1, likewise of substantially box-like shape. Two opposite narrow sides of the plug-in inlet 62 are each provided with a recess 63 to accommodate a latching lug 7 of the plug in connector 1. The recess 63 is dimensioned in the axial direction such that the plug-in connector 1 and the plug-in inlet 62 can be displaced axially in relation to each other within certain limits when in the latched state.

The two finger-like guide elements 64 and 65 are of flat design and the finger tips thereof are provided with run-on chamfers 69. Arranged on the upper side of each guide element is a web-like elevation 67. This elevation 67 is used for mechanically stabilizing the flat guide elements. In addition, part of this elevation 67 begins in a manner set back axially. A chamfer 70 is provided at the start of this set-back part. This chamfer 70 and the adjacent operative faces 66 come into engagement with the wing-like extensions 26 on the locking element 25 when the plug-in inlet is inserted into the holder 20 of the coupling configuration. Further chamfers 71 for the guidance of the guide elements 64 and 65 are provided on the narrow edges of the flat guide elements.

FIGS. 10 to 13 permit further details of the novel coupling configuration to be seen. Thus, FIG. 10 shows the engagement of the locking element 25 in the recess 10 in the sliding key 5 of the plug-in connector housing 3. FIG. 10 also permits the assignment of a finger-like guide element 64 having the chamfer 70 to a wing-like extension 26 of the locking element 25 to be seen. When the plug-in inlet and the plug-in connector are joined, the chamfer 70 lifts up the wing-like extension 26 and therefore guides the locking lug of the locking element out of the recess 10 in the plug-in connector housing 3. This takes place at an instant at which the latching lugs 7 of the latching arms 6 (see FIG. 11) are latched into the corresponding recesses 63 in the plug-in inlet 62. In order to ensure that plug-in connector and plug-in inlet latch with each other before the guide element 64 releases the locking element, the distance a of the latching edge 73 of the recess 63 from the inclined faces 70 on the guide elements 64/65 have to be chosen to be less than the sum of the distance b of a latching lug 7 from the recess 10 in the sliding key of the plug-in connector and the distance c of the locking lug 54 from the wing-like extensions 26 of the locking element 25.

Figure 12:
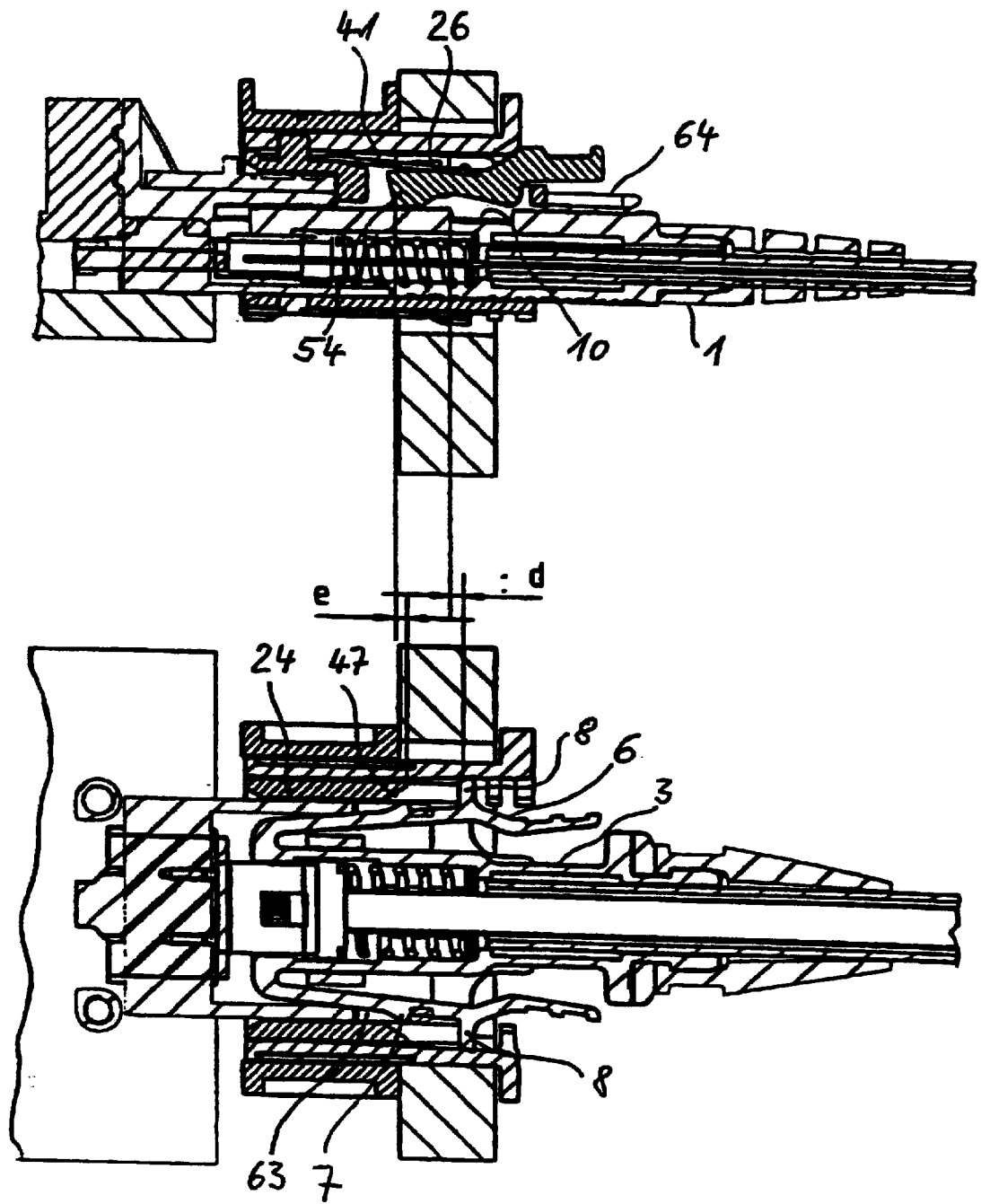
FIG. 12 shows two further horizontal longitudinal sections to illustrate the distances required for the unlocking operation.

When the coupling configuration is uncoupled by pulling the coupling partners arranged on a circuit board, and therefore the associated plug-in inlets, out of the holders 20 and the plug-in connectors 1 arranged therein, according to FIG. 12, first of all the operative connection between the finger-like guide elements 64 and 65 and the wing-like extensions 26 of the locking element is cancelled, as a result of which the locking lug 54 latches into the corresponding recess 10 in the plug-in connector 1 again. Then, the plug-in connector is also pulled further to the left in the axial direction by the coupling between latching lug 7 and recess 63 in the coupling partner, the transverse webs 8 provided on the latching arms 6 running with their run-on chamfers onto the chamfers 47 in the inner housing 24. This results in the latching arms 6 being pressed against the plug housing 3 and finally the latching between the latching lugs 7 and the recesses 63 is cancelled. For this purpose, the distance d provided in the plug-in direction of the recess 10 in the sliding key 7 from the web 8 running transversely is greater than the distance e provided in the plug-in direction of the latching lug 54 from the inclined plane provided in the inner housing 24 and forming the run-on chamfer 47.

In the coupling configuration illustrated, both plug-in connectors 1 are of identical design and are arranged in mirror-image fashion in relation to each other. Accordingly, the two holders that are each formed of a clip, an outer housing and an inner housing are of identical design and are arranged in mirror-image fashion in relation to each other in an opening in the wall of the housing 3. The two coupling partners 60 are likewise of identical design and are arranged in mirror-image fashion in relation to each other. One coupling partner is arranged on the upper side and the other on the underside at the edge of the circuit board 72.

We claim:

1. A multichannel optical coupling configuration, comprising:

a plug-in connector having a housing;

a multichannel optical fiber end piece configured in an axially resilient manner in said housing of said plug-in connector;

a circuit board;

a coupling partner configured on said circuit board, said coupling partner having a plug-in inlet for accommodating said housing of said plug-in connector in order to make a plug-in connection with said plug-in connector, said coupling partner defining a plug-in direction, said plug-in-inlet formed with a recess;

a housing wall formed with a recess;

a holder for being configured in said recess in said housing wall, said holder for guiding and retaining said plug-in connector and for guiding said coupling partner, said holder including an outer housing configured to be displaceable at right angles to the plug-in direction, said holder including an inner housing configured pivotably in said outer housing;

a locking element designed as a lever having two arms, said locking element configured on said inner housing of said holder, said locking element for retaining said plug-in connector in said holder; and a spring acting on one of said two arms of said locking element;

said housing of said plug-in connector including at least one resilient latching arm with a latching lug that can be accommodated in said recess of said plug-in-inlet in order to latch said plug-in connector to said coupling partner;

said plug-in inlet of said coupling partner having finger-like guide elements extending in the plug-in direction, said guide elements having operative faces configured in a stepped manner;

said inner housing of said holder having guide faces cooperating with said guide elements for coupling said coupling partner in an accurately fitting manner to said plug-in connector;

said one of said two arms of said locking element having operative faces for unlocking said locking element; and said recess of said plug-in inlet and said operative faces on said guide elements of said plug-in inlet being staggered in the plug-in direction such that when said coupling partner is joined to said plug-in connector retained in said holder, said locking element that is retained in said holder is unlocked after said latching lug of said plug-in connector has latched in said recess in said plug-in inlet.

2. The coupling configuration according to claim 1, wherein:

one of said two arms of said locking element has an end designed as a locking lug;

said housing of said plug-in connector has a web that forms a sliding key; and said web is formed with a recess for engaging said locking lug of said locking element.

3. The coupling configuration according to claim 1, wherein:

said guide elements are of a flat design;

each of said guide elements has tip with a chamfer for aligning said holder;

each of said guide elements has an outwardly pointing guide face with a web-like elevation that is set back with respect to said tip;

said web-like elevation has an end facing said tip; and
said end facing said tip has a chamfer for engaging said locking element.

4. The coupling configuration according to claim 1, wherein:
said housing of said plug-in connector is of flat design;
said housing of said plug-in connector has a broad side with a sliding key for correctly laterally assigning said holder;
said housing of said plug-in connector has opposing narrow sides;
said resilient latching arm is formed on one of said narrow sides;
another one of said narrow sides of said housing of said plug-in connector has a resilient latching arm with a latching lug;
said locking element is mounted on said inner housing being assigned to said broad side of said housing of said plug-in connector;
said locking element is configured as a rocker that extends in the plug-in direction;
said housing of said plug-in connector is formed with a recess extending in the plug-in direction;
said locking element having a first end that is subject to action of said spring, said first end is designed as a locking lug to engage in said recess of said housing of said plug-in connector, said locking element having a second end that is freely accessible;
said locking lug of said locking element has wing-like extensions that run transversely with respect to the plug-in direction;
said guide elements of said plug-in inlet of said coupling partner having inclined faces for unlocking said locking element;
said wing-like extensions are cooperatively associated with said inclined faces of said coupling partner;
said recesses in said plug-in inlet of said coupling partner are dimensioned in the plug-in direction to permit a relative movement between said plug-in inlet and said housing of said plug-in connector in a latched state;
each one of said recesses in said plug-in inlet of said coupling partner defining a latching edge;
said guide elements of said plug-in inlet having inclined faces; and
a distance, in the plug-in direction, from said latching edge of each one of said recesses in said plug-in inlet to said inclined faces on said guide elements of said plug-in inlet is less than a sum of a distance, in the plug-in direction, from said latching lug of said resilient latching arm of said plug-in connector to said recess in said housing of said plug-in connector and a distance from said locking lug to said wing-like extensions.

5. The coupling configuration according to claim 4, wherein:
said at least one resilient latching arm defines a first latching arm having a first web configured behind said latching lug, said first web running transversely to the plug-in direction;
said housing of said plug-in connector includes a second latching arm having a latching lug and a second web configured behind said latching lug thereof, said second web running transversely to the plug-in direction;
said inner housing of said holder has an inclined plane cooperatively associated with said first web in order to unlatch said latching lug of said first latching arm in said inner housing of said holder; and
a distance, in the plug-in direction, from said recess in said housing of said plug-in connector to said first web being greater than a distance, in the plug-in direction, from said locking lug of said locking element to said inclined plane of said inner housing.

6. The coupling configuration according to claim 1, comprising:
a supporting clip for fixing said outer housing of said holder in said housing wall.

7. The coupling configuration according to claim 6, wherein:
said outer housing of said holder includes a U-shaped plastic part and a U-shaped sheet-metal part that is placed on said plastic part as a clip;
said sheet-metal part has latching tongues to retain said outer housing in said supporting clip; and
said sheet-metal part has a pin and said plastic part is formed with a hole for pivotably mounting said inner housing of said holder.

8. The coupling configuration according to claim 7, wherein:
said inner housing includes a plastic part with a substantially box-like outer contour;
said plastic part has two opposing walls defining guide faces formed with webs and guide grooves for said plug-in connector and for said plug-in inlet of said coupling partner;
one of said two walls is formed with a hole for engaging said pin of said sheet-metal part of said outer housing;
said outer housing is formed with a hole;
another one of said two walls has an outer side with a pin for engaging in said hole in said outer housing;
said holder has an edge that faces said coupling partner; and
said hole in said one of said two walls, said hole in said outer housing, said pin in said outer side, and said pin of said sheet-metal part of said outer housing are configured adjacent said edge of holder that faces said coupling partner.

9. The coupling configuration according to claim 8, wherein:
said webs of said plastic part of said inner housing, as viewed in the plug-in direction of said coupling partner, begin behind said pin of said sheet-metal part and said hole of said plastic part.

10. The coupling configuration according to claim 8, comprising:
a further guide web;
said housing of said plug-in connector having a side with a sliding key formed as a web for correctly laterally positioning said holder;
one of said two walls of said plastic part of said inner housing having two L-shaped webs of L-shaped cross section having outer L-shaped faces and inner L-shaped faces;
said two webs forming a guide groove between said outer L-shaped faces;
said guide groove being for said sliding key on said housing of said plug-in connector;
said sliding key and said inner L-shaped faces forming guide faces for said finger-like guide elements of said plug-in inlet; and said further guide web being configured laterally beside said L-shaped webs to align said finger-like guide elements.

11. The coupling configuration according to claim 10, comprising:

pins configured in said L-shaped webs;

said locking element being configured as a rocker;

one of said two arms of said locking element having an end designed as a locking lug; and said pins mounting said locking element such that said locking lug projects into said guide groove for said sliding key.

12. The coupling configuration according to claim 1, comprising:

two plug-in connectors and two holders configured in mirror-image fashion in relation to each other in said recess in said housing wall;

said plug-in connector being one of said two plug-in connectors; and said holder being one of said two holders.

13. The coupling configuration according to claim 12, comprising:

two coupling partners each selected from a group consisting of an optical receiver module and a transmitter module;

said circuit board having two sides;

said two coupling partners configured in mirror-image fashion on said two sides of said circuit board; and said coupling partner being one of said two coupling partners.

* * * * *